United States Patent [19]

Aragoncillo Ballestero

[11] Patent Number: 5,309,498
[45] Date of Patent: May 3, 1994

[54] MAINTENANCE UNIT FOR MODULAR PUBLIC TELEPHONE

[75] Inventor: Antonio Aragoncillo Ballestero, Madrid, Spain

[73] Assignee: Telefonica de España, S.A., Madrid, Spain

[21] Appl. No.: 820,929

[22] Filed: Jan. 15, 1992

[30] Foreign Application Priority Data

Jan. 31, 1991 [ES] Spain ................................. 9100253

[51] Int. Cl.⁵ ...................... H04M 1/24; H04M 17/00
[52] U.S. Cl. ........................................ 379/21; 379/27; 379/155
[58] Field of Search ...................... 379/27, 13, 155, 21

[56] References Cited

U.S. PATENT DOCUMENTS 4,691,336  9/1987  Durston ................................. 379/21
4,926,458  5/1990  Reger et al. .......................... 379/27
4,996,703  2/1991  Gray ................................. 379/41 X Primary Examiner—Stephen Chin
Assistant Examiner—Paul Loomis
Attorney, Agent, or Firm—Mason, Fenwick, & Lawrence

[57] ABSTRACT

Maintenance unit for modular public telephone, the unit being made up based on a microprocessor, a block for communication with the modular telephone, a rotating switch to take measurements and a condenser charger for the modular public telephone, with a rapid condenser charger to feed the modular telephone that will load the logic and the activators, allowing the unit to communicate through any telephone situated on a line protected by a validation and identification unit, and carrying out the same through the selection of the identification number on turning switches. The unit also has circuit blocks to measure feed condenser voltage, line current, alternative voltage with respect to grounding and the state of the battery.

4 Claims, 2 Drawing Sheets

MAINTENANCE UNIT FOR MODULAR PUBLIC TELEPHONE

OBJECT OF THE INVENTION

The present invention refers to a maintenance unit for the modular public telephone, with the specific intention of allowing communication with the validation and identification unit (V.I.U.) of the said telephone and, where applicable, through this to the switching centre, for the rapid identification of breakdowns, also allowing the charging of feed condensers through a direct connection.

SCOPE OF THE INVENTION

This invention is applicable within the field of telecommunications, and specifically as part of the infrastructure required for the correct working of the new public telephone service that allows the use of credit cards.

BACKGROUND OF THE INVENTION

Various systems and units are currently known that cover the work of identifying breakdowns in equipment connected to them and which it is desired to control.

However, none of the systems and units known until now have maintenance functions and characteristics as well as those of identification, covering at the same time the communication requirements representing as a whole any object similar to the modular public telephone maintenance unit object of the present invention.

This unit, which is specifically applicable within the management system of the modular public telephone, arose from the need for the rapid charging of feed condensers for the modular public telephone itself, aside from the measurement of a series of parameters through the validation and identification unit (V.I.U.), in order to allow rapid identification of breakdowns and having to carry out the communications protocols with the validation and identification unit in order to initiate and conclude a telephone call.

DESCRIPTION OF THE INVENTION

The modular public telephone maintenance unit allows communication through the use of any telephone on a protected line with the validation and identification unit, by selecting the modular public telephone identification number through the use of rotary switches.

The modular public telephone maintenance unit is able to measure feed condenser (logical and activator) voltages and also the voltage of the line current, alternating voltages with respect to grounding, detecting and producing a diagnosis of tariff measuring pulses of 12 kilohertz "Khz" of the modular telephone, all this allowing a rapid identification of breakdowns and also allowing the rapid charging of feed condensers in the modular public telephone, by doing no more than pressing a key.

The feed for the modular public telephone maintenance unit consists of a rechargeable battery which is compatible with the rechargeable battery of the telephone multi-tester that, as is known, is the equipment used currently to carry out telephonic tests and is also interchangeable with the same.

In order to use the telephone of the maintenance person in a protected line with the validation and identification unit, the unit is inserted between the line and the telephone.

Pressing the "call" button a message is sent with the modular public telephone identification number to the validation and identification unit and, if correct, the validation and identification unit connects the line of the modular public telephone to the switching centre.

Thereafter a call can be made with a conventional telephone.

Furthermore, the maintenance unit has a display to show the measurements that can be taken, which measurements are selected using a rotary switch.

The measurement that can be taken are the following:
Measurement of the voltage of the feed condensers.
Measurement of line current.
Measurement of alternate voltage on the line.

In order to measure the voltages of the feed condensers, the cable charging the condensers must be connected to the telephone.

In order to measure line current, this is done through a 1 ohm resistor which is inserted in the line.

To measure common alternative voltages induced in the line, there must be a metal point connected to earth.

While the unit is active and connected to the telephone line, it constantly supervises the presence of 12 Khz computation pulses.

If the unit detects the same computation pulses, a set of L.E.D.'s indicates whether the pulse is correct or if a frequency deviation exists in the line.

Lastly, the "END" key is pressed, a timed opening occurs and the message is sent corresponding to the reply sent by the validation and identification unit.

The line then goes into a rest mode.

Rapid charging of feed condensers in the modular public telephone is begun by pressing the "Load" key.

The unit also has a "TST BAT" key to permit the state of the battery to be tested and its voltage can be seen on the unit visualizer.

The CALL, END, LOAD and TEST BAT keys are appropriately marked and signed so that they can be identified.

DESCRIPTION OF THE DRAWINGS

In addition to the description given and in order to aid in a better understanding of the characteristics of the invention, attached to the present descriptive memorandum and as an integral part of the same, are two sheets of plans representing, as an illustration but not as a limitation, the following.

DETAILED DESCRIPTION OF THE PREFERRED EMBODIMENT

Figure 1:
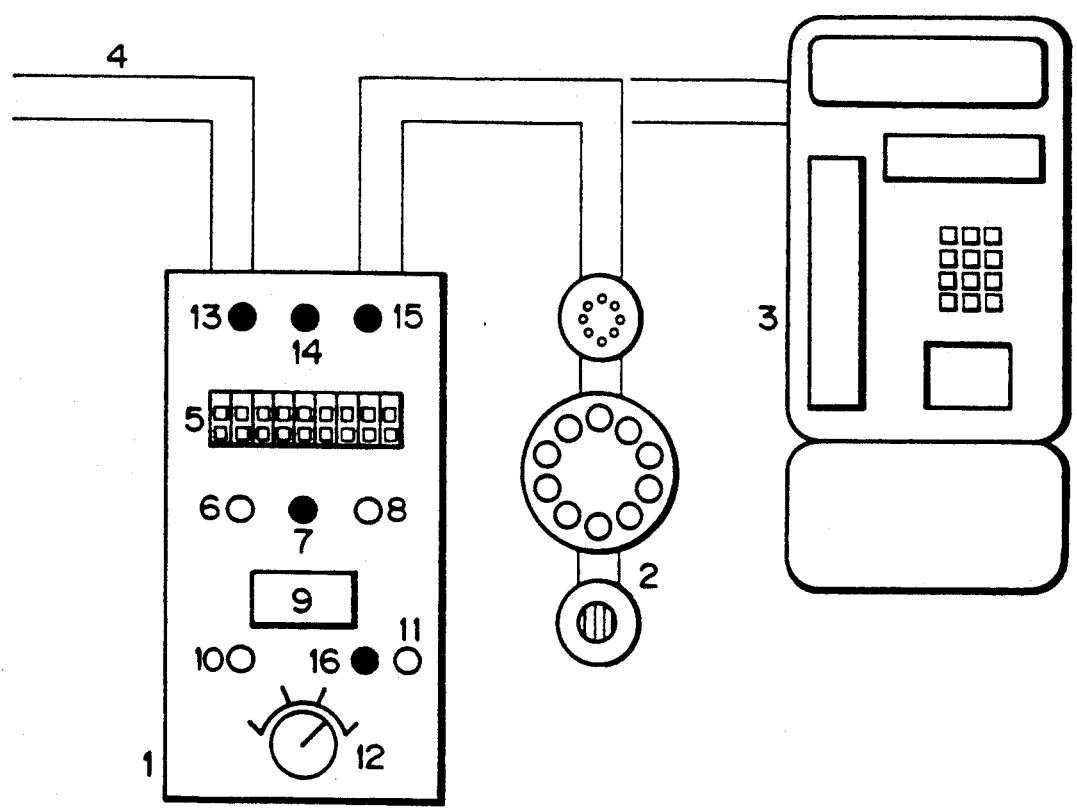
FIG. 1—This shows us a front view of the maintenance unit for the modular public telephone object of the present invention, and indicates the different keys and led's forming the same, as well as its connection to the telephone line.

In the light of these figures, it may be observed that in the modular public telephone maintenance unit (1) the invention proposed is inserted between the telephone line (4) and the modular telephone (3), and the same is used once the pertinent connection is made to a conventional telephone (2) to make the call.

Identification of the telephone (2) is made using certain keys (5) shown in the area corresponding to the unit.

While the equipment (1) is active and connected to the telephone line (4), the presence of twelve KHz computation pulses is supervised.

By the use of certain L.E.D.'s (14) there is an indication of whether the pulse is correct, but if there is a frequency deviation of more than 3% this is indicated on the L.E.D.'s shown as (15).

If there is a deviation of more than 10% this situation is indicated by the indicator or L.E.D.'s shown with reference (13).

The CALL button is indicated by (6), while the END key is referenced as (8) and the WAIT key has reference (7).

Rapid charging of feed condensers is begun by pressing the charge key (11), and L.E.D.'s (16) then lights up while the charge is being carried out.

The modular public telephone maintenance unit has a display (9) intended to present the measurements that can be taken: these measurements are selected using a rotary switch (12).

Figure 2:
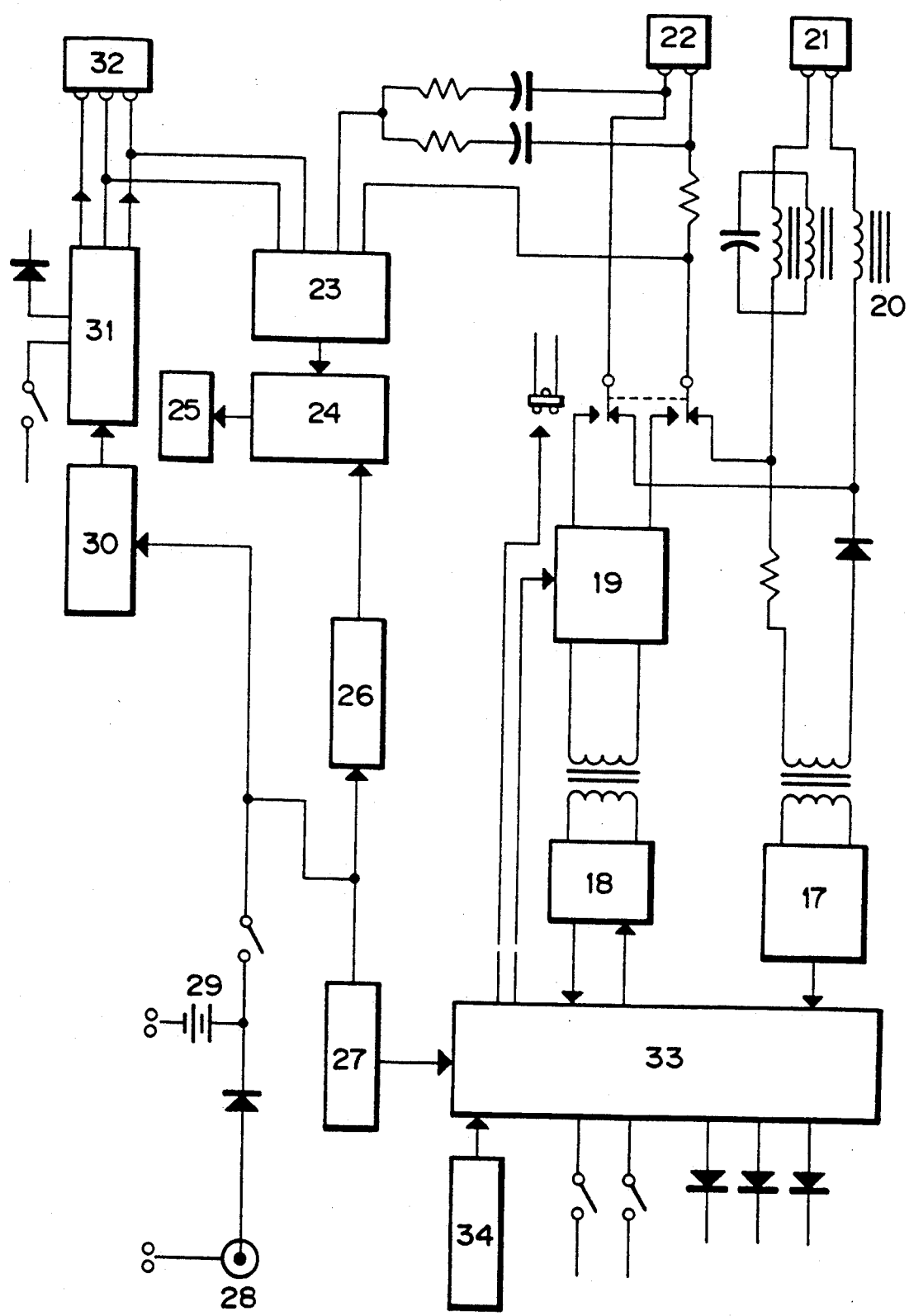
FIG. 2—This shows a block diagram of the maintenance unit represented in FIG. 1.

In FIG. 2, which shows a block diagram of the maintenance unit, reference (21) refers to the telephone while the connection to the line has reference (22) and the condensers have reference (32).

The microprocessor (33) controls the modem (18) and the connection to the telephone, and reference is also made to a filter (17) and a 12 KHz suppression circuit (20).

Also the identification of the modular telephone is taken at the input (34).

The modem (18) is followed by a line input circuit (19).

The switching system is represented by a feed source (27), an insulated voltage converter (26), an A/C converter (24), a switch (23)( and the display (25).

also on this layout or block diagram shown in FIG. 2 are indicated with (28) the battery charger, the battery itself (29), a 6/12 V converter (30) and the condensers charger (31).

The condensers are shown with the reference (32) on the mentioned block diagram.

It is not considered necessary to extend this description further for any expert on the subject to understand the scope of the invention and the advantages arising from the same.

The materials, shape, size and layout of the elements are susceptible to variation always provided that this does not give rise to any alteration in the essentials of the invention.

The terms in which this memorandum has been described must always be taken in the widest sense with no limitations.

I claim:

1. A modular public telephone maintenance unit for use with a modular public telephone having condensers and lacking a battery, wherein the modular public telephone is on a telephone line protected by a validation and identification unit, said modular public telephone maintenance unit comprising:

a telephone connection selectively connectable with a modular public telephone, whereby said modular public telephone maintenance unit can be selectively inserted between the telephone line and the modular public telephone for interposition of said modular public telephone maintenance unit between the validation and identification unit and the modular public telephone; and charger means connectable with the condensers of the modular public telephone for rapidly charging the condensers; and wherein said modular public telephone maintenance unit is portable.

2. A modular public telephone maintenance unit for use with a modular public telephone having condensers and interposed between a validation and identification unit and the modular public telephone, said modular public telephone maintenance unit comprising:

a telephone connection selectively connectable with a modular public telephone;

charger means connectable with the condensers of the modular public telephone for rapidly charging the condensers;

testing means for conducting measurements of the voltage of the condensers and the voltage and current of the line; and switch means for selecting a measurement to be taken using said testing means.

3. A modular public telephone maintenance unit for use with a modular public telephone having condensers and interposed between a validation and identification unit and the modular public telephone, wherein the modular public telephone has an identification number, said modular public telephone maintenance unit comprising:

a telephone connection selectively connectable with a modular public telephone;

charger means connectable with the condensers of the modular public telephone for rapidly charging the condensers;

input means for selecting a number corresponding to the identification number of the modular public telephone; and means for transmitting the identification number to the verification and identification unit.

4. The maintenance unit of claim 1, wherein said charger means includes a rechargeable battery, and wherein said maintenance unit further comprises:

testing means for testing the state of said battery; and a battery charger connected to said battery, said battery charger being compatible with a battery of a conventional telephonic multi-tester.

* * * * *